United States Patent
Liu

(10) Patent No.: US 9,063,790 B2
(45) Date of Patent: Jun. 23, 2015

(54) SYSTEM AND METHOD FOR PERFORMING DISTRIBUTED PARALLEL PROCESSING TASKS IN A SPOT MARKET

(75) Inventor: Huan Liu, Sunnyvale, CA (US)

(73) Assignee: Accenture Global Services Limited, Dublin (IE)

( * ) Notice: Subject to any disclaimer, the term of this patent is extended or adjusted under 35 U.S.C. 154(b) by 324 days.

(21) Appl. No.: 13/159,281

(22) Filed: Jun. 13, 2011

(65) Prior Publication Data
US 2012/0317579 A1  Dec. 13, 2012

(51) Int. Cl.
*G06F 9/46* (2006.01)
*G06F 9/50* (2006.01)
*G06F 11/14* (2006.01)

(52) U.S. Cl.
CPC .......... *G06F 9/5072* (2013.01); *G06F 11/1438* (2013.01)

(58) Field of Classification Search
None
See application file for complete search history.

(56) References Cited

U.S. PATENT DOCUMENTS

| | | | |
|---|---|---|---|
| 5,923,832 A | 7/1999 | Shirakihara et al. | |
| 6,161,193 A | 12/2000 | Garg et al. | |
| 6,260,125 B1 | 7/2001 | McDowell | |
| 6,345,282 B1 | 2/2002 | Minyard | |
| 6,751,562 B1 * | 6/2004 | Blackett et al. | 702/61 |
| 7,117,391 B1 | 10/2006 | Hornick et al. | |
| 2002/0188426 A1 | 12/2002 | Datta et al. | |
| 2007/0043975 A1 | 2/2007 | Varadarajan et al. | |
| 2007/0277056 A1 * | 11/2007 | Varadarajan et al. | 714/15 |
| 2008/0030764 A1 * | 2/2008 | Zhu et al. | 358/1.15 |
| 2008/0109343 A1 * | 5/2008 | Robinson et al. | 705/37 |
| 2008/0243935 A1 | 10/2008 | Castro et al. | |
| 2011/0265164 A1 * | 10/2011 | Lucovsky et al. | 726/7 |

OTHER PUBLICATIONS

Network-aware Selective Job Checkpoint and Migration to Enhance Co-allocation in Multi-cluster Systems; William M. Jones; Computer Science Department; Coastal Carolina University, Conway, SC 29526; http://www.coastal.edu/cs/ Feb. 13, 2009.
IEEE Xplore; On Demand Check Pointing for Grid Application Reliability Using Communicating Process Model; Baghavathi Priya, S.; Subramaniam, C.; Ravichandran, T.; Jawaharlal Nehru Technol. Univ., Hyderabad, India. Advanced Communication Technology (ICACT), 2011 13th International Conference on Feb. 13-16, 2011, pp. 393-398.
Chohan, N., Castillo, C., Spreitzer, M., Steinder, M., Tantawi, A., and Krintz, C. See Spot Run: using spot instances for mapreduce workflows. In Proceedings of the 2nd USENIX Conference on Hot topics in cloud computing (Berkeley, CA, USA, 2010), HotCloud 10, USENIX Association, pp. 7-7.
Guy Rosen. Estimated EC2 Daily Usage. http://www.jackofallclouds.com/2010/12/recounting-ec2/. Dec. 29, 2010.
Liu, H., and Orban, D. Cloud mapreduce: a mapreduce implementation on top of a cloud operating system. In Proc. IEEE/ACM International Symposium on Cluster Computing and the Grid (Newport Beach, USA, 2011), CCGRID '11, IEEE Computer Society.
Yi, S., Kondo, D., and Andrzejak, A. Reducing costs of spot instances via checkpointing in the amazon elastic compute cloud. In Proc. 3rd IEEE Intl. Conf. on Cloud Computing (2010), pp. 236-243.

* cited by examiner

*Primary Examiner* — Emerson Puente
*Assistant Examiner* — Jonathan R Labud
(74) *Attorney, Agent, or Firm* — Fish & Richardson P.C.

(57) ABSTRACT

As a result of the systems and methods described herein, an alternative MapReduce implementation is provided which monitors for impending termination notices, and allows dynamic checkpointing and storing of processed portions of a map task, such that any processing which is interrupted by large scale terminations of a plurality of computing devices—such as those resulting from spot market rate fluctuations—is preserved.

46 Claims, 6 Drawing Sheets

Exemplary Computer System 600

SYSTEM AND METHOD FOR PERFORMING DISTRIBUTED PARALLEL PROCESSING TASKS IN A SPOT MARKET

BACKGROUND

Cloud computing provides traditional information technology resources like computation, capacity, communication, and storage on demand. Typically, cloud computing vendors offer their consumers the ability to access and rent these resources at agreed upon rates. These arrangements can offer significant benefits to the consumers over traditional enterprise data center implementations, which typically feature a network of computing technology hardware that is privately procured, integrated, secured, and monitored independently. These benefits include providing the ability to provision additional resources on demand, dynamically scale a client's application or system, and limit costs to reflect actual resource usage and consumption. In addition, the advantages inherent to avoiding constructing and maintaining a network architecture—such as eliminating the time required for hardware procurement and assimilation and the notorious difficulties of software integration—are also provided through the utilization of the cloud computing model.

The majority of current cloud computing infrastructures consist of numerous servers with varying levels of virtualization technologies. Architecturally, cloud computing data center networks can resemble traditional enterprise architectures, albeit on a (generally) much grander scale. For example, the architecture for a typical data center network for any particular cloud computing vendor may be implemented as a hierarchy of routers and concentric subnets connecting a large network of servers, often numbering in the hundreds or thousands. However, like enterprise infrastructures, cloud computing data center networks are typically under-provisioned relative to a total, aggregate peak demand for all consumers, and often by a significant factor. This under-provisioning can compromise the efficacy of the network and prevent the network from performing at its supposed level of throughput when the simultaneous demand for resources is high.

As a solution to mitigate this problem, utilization of a spot market has been recently employed among some prominent cloud computing vendors. In a cloud spot market, the cost for certain computing resources can fluctuate, according to demand. Typically, processing services (as opposed to communication or storage services) experience the most drastic impact of high demand, and, accordingly, processing service rates often experience the most elasticity. Spot market allows consumers to automatically cease operation of some or all of a consumer's requisitioned cloud computing resources when the service rate for the resource gets too high (e.g., exceeds a pre-determined threshold rate), and to automatically restart operation (and thus, resume incurring service fees) when the current service rate drops below the threshold rate. This allows those consumers to reduce the costs incurred by cloud computing service fees, take advantage of reduced rates, all while potentially alleviating the strain of accommodating a high number of consumers during peak demand hours or times.

MapReduce is an increasingly popular programmed framework for processing application data in parallel over a plurality of computing units, and is especially suited to cloud computing (e.g., by performing the parallel processing in provisioned virtual machines in a cloud infrastructure). The individual computing units themselves which perform the processing are often referred to as "nodes." According to conventional practice, MapReduce performs the data processing of an application over a series of "map" and "reduce" steps.

During a map step, a "master" (control) node takes the input (such as a processing task) from an input, partitions it up into smaller sub-tasks suitable for processing in a queue (typically, an instance of a communication or messaging service), and distributes the sub-tasks to "worker" (processing) nodes. The worker nodes process the sub-tasks, and pass the resultant data back to its master node. During the reduce step, the master node then takes the processed data from all the sub-tasks and combines them in some way to derive the output—which, when aggregated and organized, becomes the output of the original task to be performed. Once the output is derived, the output can be "committed"—that is, stored. Within a cloud computing infrastructure, storage of the outputs can be temporarily stored in an instance of a storage service, such as an instanced database. Alternatively, the output can be stored in memory (either volatile or non-volatile) of the master node.

One of the benefits of the MapReduce framework is that it allows for distributed parallel processing of the map and reduction operations, rather than typical sequential processing. For example, if each mapping operation is independent of the others, all maps can be performed in parallel. Similarly, a number of 'reducers' can perform the reduction phase. A feature of MapReduce implementations over traditional server solutions is that the MapReduce framework can be applied to significantly larger datasets with greater efficiency. The distributed structure of processing task assignments also offers some degree of fault tolerance during node failures, since the sub tasks can be rescheduled and reassigned.

Although conventional MapReduce implementations can tolerate failures, they are ill-suited to the spot market environment. Conventional MapReduce implementations are designed to tolerate infrequent or smaller-scale machine failures, but are unable to cope with massive, simultaneous machine terminations caused by a spot price rate increase. If the primary and backup master nodes fail, no computation can progress. More problematically, the processing performed by the nodes for a specific map task which has not been committed (stored) can be lost during termination as well. Even if the master nodes do not run on spot instances, several simultaneous node terminations could cause all replicas of a data item to be lost. In addition to data corruption, operation pauses and delays can significantly lengthen MapReduce computation times.

SUMMARY

As a solution to the type of problems noted above, this disclosure provides novel methods and systems for performing distributed parallel processing tasks in a spot market. This approach provides an alternative MapReduce implementation which allows dynamic storing of processed portions of a map task, such that any processing which is interrupted by a termination of a computing device is preserved.

In an embodiment, a method is provided which allows a distributed parallel processing framework (such as a MapReduce framework) to dynamically generate system checkpoints during a system termination for a sub-task being processed. By creating the system checkpoint, the sub-task is further partitioned to delineate the already processed portion from the yet to be processed portion. The method further includes storing the processed portion in a persistent storage (such as an instanced database or non-volatile memory) and adding the yet to be processed portion of the sub-task as a new sub-task to a task queue.

By leveraging the capabilities of dedicated computing components (which may or may not be cloud components), a distributed parallel processing framework is described that can still provide the benefits of concurrent parallel processing of map tasks while avoiding processed data loss occurring during a system termination. Accordingly, this allows a MapReduce framework executed on large data centers such as cloud computing infrastructures the flexibility to operate even in a spot market.

According to another embodiment, a system of communicatively coupled computing components is provided configured to implement and execute the method described above. This system includes a plurality of computing devices used to process the individual sub-tasks, a persistent storage component or access to a persistent storage service, and one or more data queues which implement the queues (map, reduce, and task) for certain distributed parallel processing frameworks (such as MapReduce).

According to various embodiments, this system may be implemented as a conglomeration of provisioned cloud computing infrastructure components, such as one or more virtual machines, an instanced database, and one or more messaging queues. Alternatively, the system may also be implemented in a single computing device with multiple processors. In still further embodiments, an impending system termination is noticed by installing programmed hooks at the operating system level to monitor for the reception of any notifications of impending system termination (e.g., due to spot market service rate fluctuation). As a result of the systems and methods described herein, an alternative MapReduce implementation is provided which monitors for impending termination notices, and allows for dynamic checkpointing and storing of processed portions of a map task, such that any processing which is interrupted by a termination of a computing device is preserved.

BRIEF DESCRIPTION OF DRAWINGS

The accompanying drawings, which are incorporated in and form a part of this specification, illustrate embodiments of the disclosure and, together with the description, serve to explain the principles of the presently claimed subject matter:

DETAILED DESCRIPTION

A framework for distributed parallel processing of input tasks is provided which dynamically generates system checkpoints during a detected system termination and partitions an in-process task (or sub-task) between completed portions and incomplete portions. The method further includes storing the completed portion in a persistent storage (such as an instanced database or non-volatile memory) and adding incomplete portion of the task or sub-task as a new entry in a task queue. This framework may be used to extend an embodiment of the MapReduce application framework to preserve processed data during massive system terminations, such as those due to spot market influences. In an embodiment, the framework may be implemented among both a traditional enterprise and cloud computing data center infrastructures.

Figure 1:
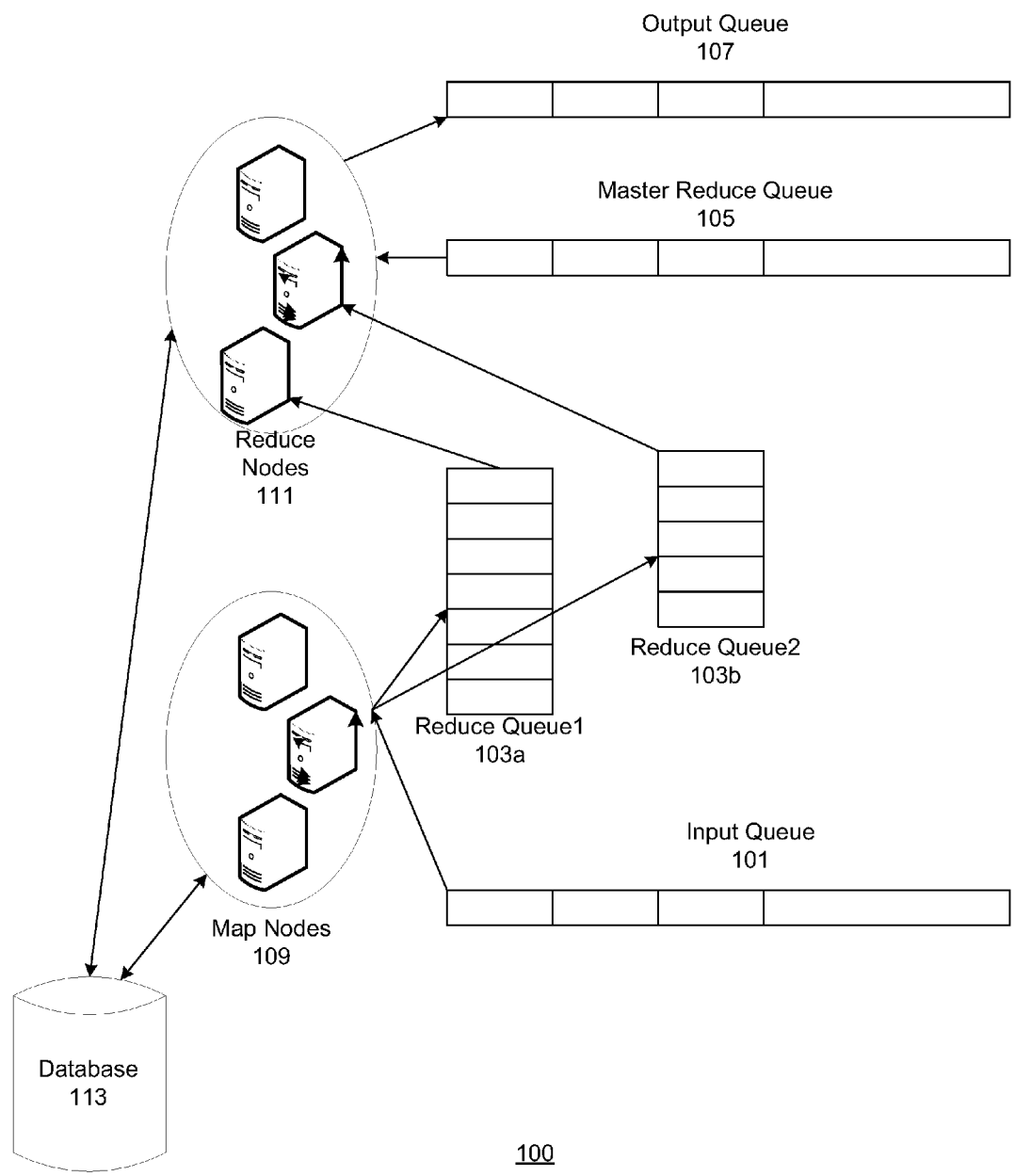
FIG. 1 depicts a block diagram of a system implementing a distributed parallel processing framework, in accordance with embodiments of the present disclosure.

As presented in FIG. 1, a block diagram of a system 100 implementing a distributed parallel processing framework is depicted, in accordance with embodiments of the present disclosure. As shown in FIG. 1, the system may comprise a plurality of queues (e.g., an input queue 101, reduce queues 103*a* and 103*b*, a master reduce queue 105, and output queue 107), a plurality of clusters of nodes (e.g., map nodes 109, and reduce nodes 111) and a persistent storage component (e.g., database 113). In one embodiment, system 100 comprises a MapReduce framework.

The system 100 may be implemented according to various embodiments with cloud infrastructure components. In one embodiment, a cloud storage service, persistent storage service, and communication service are used collaboratively to implement the parallel processing system 100. Under such an implementation, input (and/or output) data is stored in a storage service. A communication service (e.g., a queue) is used as a synchronization point where processing nodes (e.g., a process running on an instance) can coordinate job assignments as well as a decoupling mechanism to coordinate data flow between different stages. The persistent storage service serves as the central job coordination point, where each processing node's status is stored. Alternatively, the system 100 may be implemented within a traditional enterprise data center. In still further embodiments, the system 100 may be implemented in a spot market, or wherever computing resources are subject to massive or substantial failures or simultaneous termination.

According to some embodiments, the plurality of queues may be stored as instances of a dedicated and/or discrete messaging service. For example, some cloud computing vendors offer messaging services implemented as a persistent (non-volatile) queue—often subject with certain message size restraints. Though potentially unsuitable for storing larger or whole portions of data, an input task (e.g., a map task) can be effectively partitioned into a plurality of smaller sub-tasks for processing and stored as entries in such a queue. Alternatively, these queues may also be constructed as data structures in a non-volatile memory of a local or communicatively coupled computing device, such as a flash memory or hard drive.

At the start of a computation (e.g., for an application), the user provides data (e.g., work to be performed) that is stored in an input queue, such as input queue 101. The program architecture then partitions the input data into an M number of splits, where each split will be processed as a separate subtask, and a split message for each split is enqueued (appended) in the input queue. The sub-tasks are subsequently assigned to map or processing nodes of a map node cluster 109 for processing. In one embodiment, each entry of the input queue corresponds to an entry in a list of input key-value pairs. Each key-value pair is associated to a split of the input data that will be processed as one sub-task "map" task.

According to some embodiments (such as cloud computing implementations), the input data is stored in an instance of a storage service, and a split message (i.e., an entry in the input queue 101) may include a list of pointers to the corresponding files in the storage service. In some embodiments, the message can also comprise an associated range to specify a subset of a large file. To facilitate tracking, each split message may also have a corresponding unique map ID. According to further embodiments, in addition to the map task id and the corresponding file location, a split or partition also includes an offset f, which indicates the position in the file split where processing should begin. At the beginning of the sub-task processing, when the input queue is created, all split messages en-queued have an offset of 0.

While the input queue 101 holds the input tasks, results of the processed computation, e.g., the resulting key-value pairs are stored in the output queue 107. Similar to the input queue 101, which is used to assign map tasks, the master reduce queue 105 is used to assign reduce tasks to reduce nodes (e.g., reduce nodes in reduce cluster 111). According to some embodiments, the number of reduce queues can be large, and is a configurable parameter that is set by the user. The reduce queues and the master reduce queue, as well as the entries in the master reduce queue, are created and/or provisioned before the start of the commencement of processing.

When a processing node finishes a map task, it writes two pieces of information to the persistent storage service 113: the node ID and map ID pair, and the number of reduce key-value pairs the node generated for each reduce queue while processing map IDs. Updating the status through the persistent storage service 113 serves as a "commit" mechanism to signify that the input split corresponding to the map ID has been processed successfully.

The intermediate output generated from the processing is subsequently collected and stored in one or more of the reduce queues (e.g., reduce queue1 103a or reduce queue2 103b). A reduce key is subsequently used to map each intermediate output to one of the reduce queues 103a, 103b through a hash function. According to some embodiments, the hash function is a default hash function. Alternatively, a user-supplied hash function may also be used. A hash function may be implemented by, for example, taking the data (e.g., output) and/or metadata (e.g., processing node id, key value pair input, sub-task ID, etc.) and generating a value corresponding to an identification of the reduce queue storing the intermediate output. These mappings can be stored in a table for reference thereafter during the "shuffling" stage, wherein the output collected in the reduce queues (e.g., reduce queue1 103a and reduce queue2 103b) is re-assembled (or "shuffled") by the reducing cluster of nodes 111. The proper arrangement (e.g., order) of assembly may be maintained by referencing the order of the sub-tasks, deriving the corresponding intermediate ouput in the appropriate reduce queue, and combining the intermediate outputs according to the determined order.

In one embodiment, shuffling occurs as soon as the results are available and aggregated into a single output consistent with and corresponding to the original input (map) task. According to such implementations, data shuffling may be performed at least partially overlapping with map processing, thereby further reducing total processing time required. When a reduce node 103a, 103b completes a reduce task, it writes two pieces of information to the persistent storage service 113: the node ID and reduce ID pair, and the number of output key-value pairs the node generated while processing reduce queue.

Additionally, once the output is assembled, the original input task is dequeued in the master reduce queue 105, and its output is delivered from output queue 107 and stored in a persistent storage (e.g., database 113) as the application's output. The database 113 may be implemented as, for example, an instance of a persistent storage service in a cloud or traditional enterprise data center. Database 113 may also be implemented as a data structure in a non-volatile memory, such as a hard drive or in flash memory communicatively coupled to a computing device.

Once the processing nodes from map node cluster 109 finish their respective processing tasks, the reduce nodes of reduce node cluster 111 begin to poll work from the master reduce queue 105. Once a reduce node dequeues a message, the reduce node is responsible for processing all data in the reduce queue indicated by the message. After the reduce function finishes processing all data in the reduce queue 103a, 103b, the node goes back to the master reduce queue to fetch the next message to process.

In addition to reading from and writing to the various queues, both map and reduce nodes also read from and write to the persistent storage to update their respective statuses. For example, at the end of either a map or reduce task, the nodes write a commit message to persistent storage service indicating they have successfully performed the task. According to one embodiment, each node works independently of all other nodes. In still further embodiments, nodes can be heterogeneous. That is, the nodes can be located remotely relative to each other, and each can have a vastly different computing capacity. To facilitate tracking, each node also updates its progress to the persistent storage service. The node then uses the progress reports from all other nodes, including its own, to determine whether there are more tasks to get from a queue.

Figure 2:
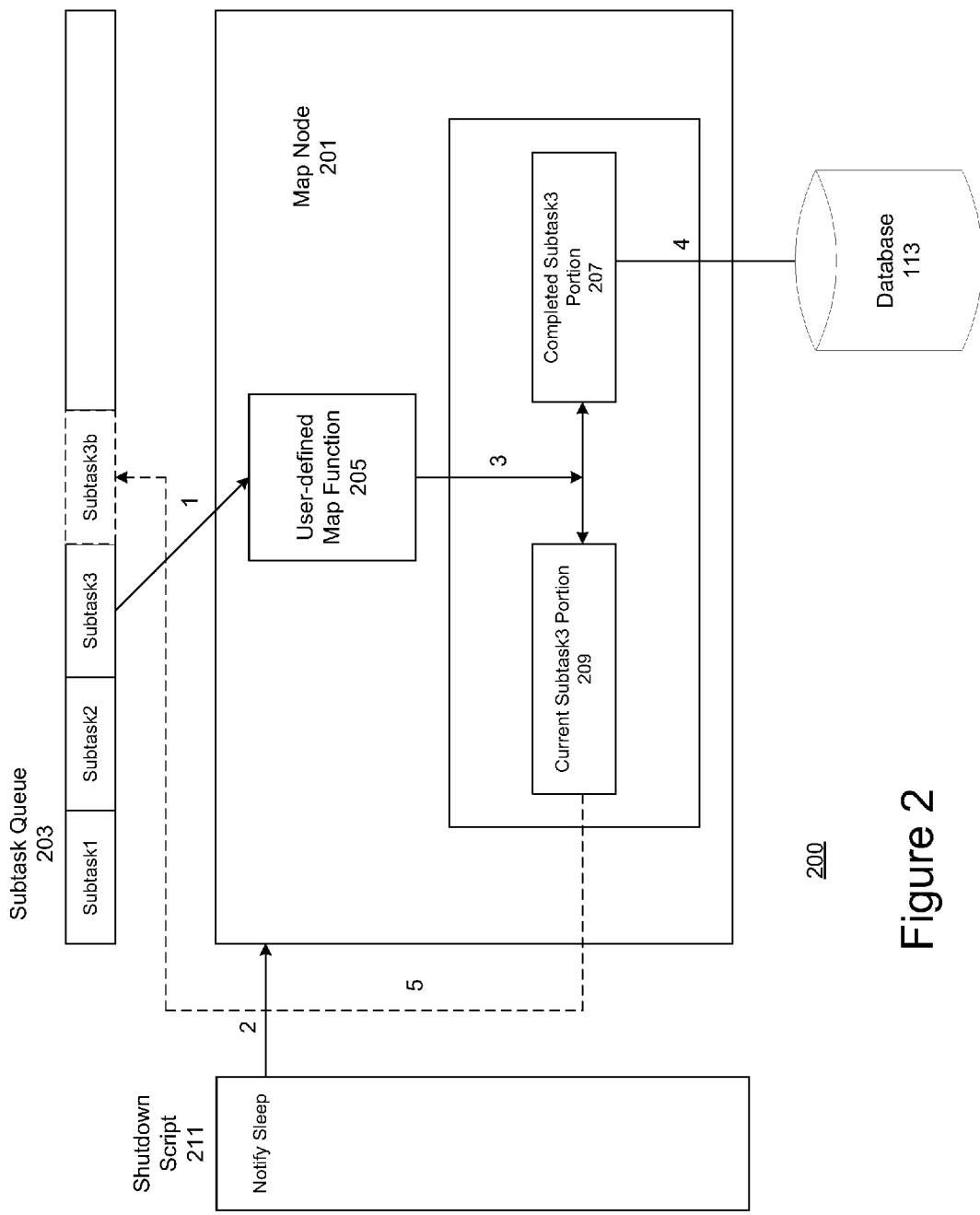
FIG. 2 depicts a data flow diagram of a system implementing a distributed parallel processing framework during a system termination, in accordance with embodiments of the present disclosure.

FIG. 2 depicts a data flow diagram of a system 200 implementing a distributed parallel processing framework during a system termination, in accordance with embodiments of the present disclosure. FIG. 2 may be implemented as the system 100 described above with respect to FIG. 1 during an impending system termination. As presented in FIG. 2, the system 200 may comprise a sub-task queue 203, map node 201, and a database 113, such as the database 113 described above with respect to FIG. 1. In one embodiment, the sub-task queue 203 may be implemented as an input queue such as the input or "map" queue 101 of FIG. 1 and populated with splits (e.g., sub-task1, sub-task2, sub-task 3) of an input task that have been partitioned into sub-tasks.

According to further embodiments, the map node 201 is implemented to include a map function such as a user-defined map function 205, consisting of the operation(s) to be performed on the input data apportioned in each entry of the sub-task queue 203 to achieve the desired output. The map node 201 may also include two buffers, such as a first buffer for storing data corresponding to a completed portion of a sub-task (e.g., staging buffer 207) and a second buffer for storing data corresponding to the remaining, incomplete portion of a sub-task (e.g., temporary buffer 209). The buffers may be implemented as temporary data structures in memory, for example.

As depicted in FIG. 2, a sub-task (e.g., sub-task3) is assigned for processing to the map node 201 at time 1. During processing, the output from one input key-value pair is first saved in a temporary buffer (e.g., buffer 209 of FIG. 2). When the user-defined map function 205 finishes the processing of one key-value pair, its output is appended to a staging buffer (e.g., buffer 207 of FIG. 2) which is then asynchronously streamed (e.g., uploaded) to the reduce queues 103a, 103b. Streaming output data allows the transmission of data from the staging buffer 207 to the reduce queues 103a, 103b as soon as possible, as a result, relatively small amounts of data are left in the buffers at any time that need to be flushed.

Since the staging buffer holds very little data, it is possible to flush out the data during even the minimal duration of a grace period of a shutdown process resulting from spot market rate fluctuation. In contrast, traditional distributed parallel processing framework implementations hold all outputs from a map split locally, and generally only upload the outputs after processing of the map split has completed successfully. According to one embodiment, output data streaming is allowed by performing filtering by reduce nodes during the reduce phase to remove duplicate or invalid outputs (e.g., from failed nodes).

During the processing of sub-task3, map node 201 receives a notification of an impending termination at time 2. The notification may be received from the operating system of the host computing system executing a shutdown script (e.g., shutdown script 209). Once the notification is received, the intermediate processed data (that is, the portion of sub-task 3 already processed prior to the notification of impending termination) held in the first buffer 207 is streamed to a persistent storage (e.g., database 113) at time 4. Thus, such an implementation is able to retain computation progress even when the instances are constantly turned off.

The remaining portion of the sub-task (sub-task3) stored in the second buffer 209 is then extracted and a new sub-task (e.g., sub-task3b) is generated in the sub-task queue 201 to process that remaining portion at time 5. Since the sub-task or input queue 201 is stored in non-volatile memory, data in the queue 201 is unaffected by the termination of the system's operation.

Figure 3:
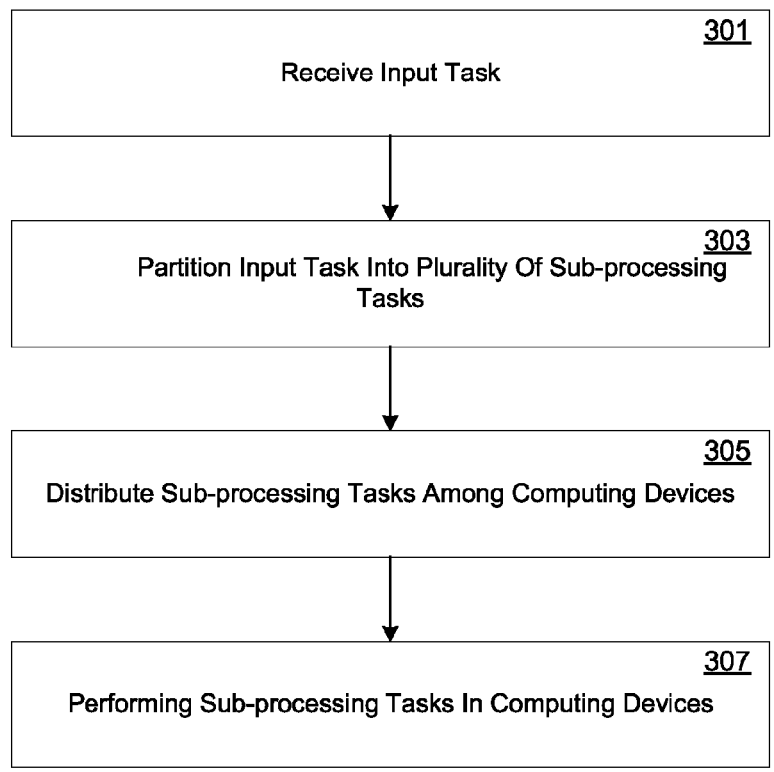
FIG. 3 depicts a flowchart of a process for distributing partitioned sub-tasks to a plurality of processing devices in a distributed parallel processing framework, in accordance with embodiments of the present disclosure.

As presented in FIG. 3, a flowchart of a process 300 for distributing partitioned sub-tasks to a plurality of processing devices in a distributed parallel processing framework is depicted, in accordance with embodiments of the present disclosure. The process 300 may be performed, for example, in the system 100 described above with respect to FIG. 1 to partition a processing task (such as a map task) into a plurality of sub-tasks for substantially concurrent or overlapping processing in a plurality of processing devices (e.g., nodes or communicatively coupled computing devices). Steps 301-307 describe exemplary steps comprising the process 300 in accordance with the various embodiments herein described.

At step 301, an input and input task are generated and/or received in an application corresponding to an application framework executing on a plurality of communicatively coupled computing devices. The input may comprise, for example, data stored in storage, such as a persistent storage (e.g., database) or in a memory. The input task may comprise a map task for processing the data. In some embodiments, the input task may be partitioned into a plurality of sub-tasks for processing at step 303. Each individual sub-task may be stored separately as an entry in a task queue. The task queue may be implemented in, for example, an instance of a messaging queue component in a cloud or traditional enterprise data center. Else, the task queue may be implemented as a data structure in a non-volatile memory.

Once partitioned at step 303, the sub-tasks may be distributed amongst the plurality of communicatively coupled computing devices for processing at step 305. The computing devices may consist of dedicated processing nodes, e.g., "map nodes," which may be physical or virtual devices. Alternatively, the computing devices may consist of general-purpose computers. According to some embodiments, the sub-tasks may be distributed by assignment. In still further embodiments, the sub-tasks may be distributed at random, or by request—wherein idle processing nodes may request and be assigned additional sub-tasks. At step 307, the sub-tasks are processed by the respective processing nodes.

If undisturbed, the sub-tasks are processed by the corresponding processing node, the output of the processing nodes ("intermediate output") may be subsequently shuffled (re-arranged) by a reducing node, the arranged output may be committed to a persistent storage (or non-volatile memory) and the corresponding sub-tasks de-queued from the task queue. If, however, the system upon which the application and application framework is executed experiences a termination during the processing of one or more sub-tasks, the process 300 immediately proceeds to step 401 of FIG. 4, described below.

Figure 4:
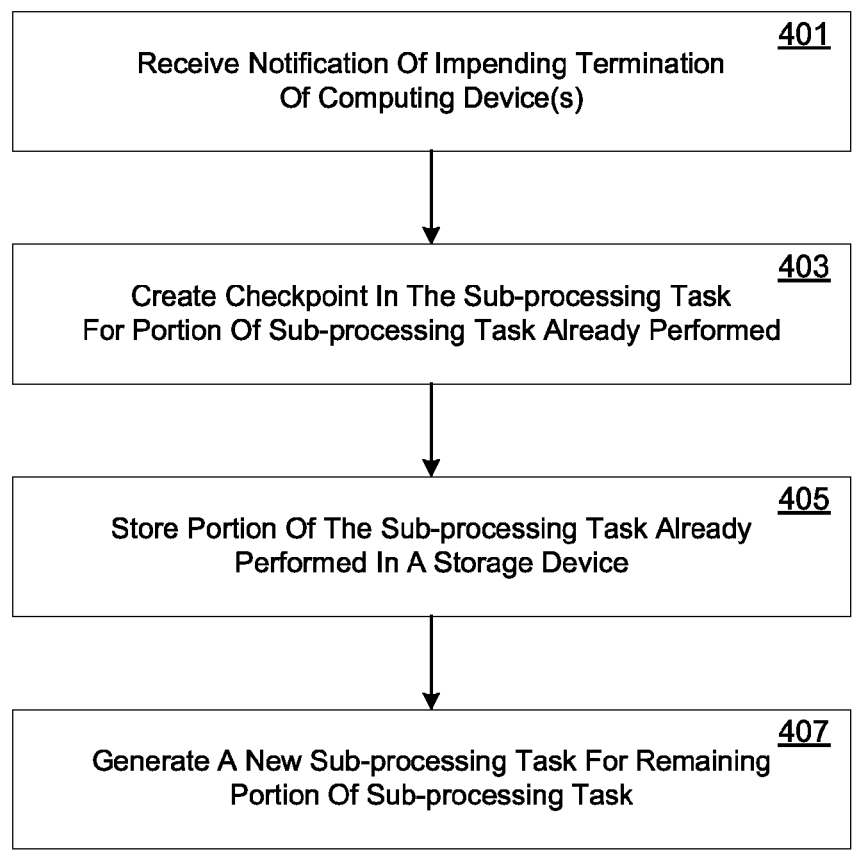
FIG. 4 depicts a flowchart of a process for preserving processed portions of a sub-task during a system termination in a distributed parallel processing framework, in accordance with embodiments of the present disclosure.

As presented in FIG. 4, a flowchart of a method 400 for preserving processed portions of data during a detected system termination in a system for distributed parallel processing is depicted, in accordance with various embodiments. Steps 401-407 describe exemplary steps comprising the process 400 in accordance with the various embodiments herein described.

In one embodiment, the method 400 is performed if a system termination is detected or a notification of an impending system termination is received by the application at step 401. Once imminent termination is determined, at step 401, a checkpoint is created in the sub-task at step 403. In one embodiment, the checkpoint delineates the portion of the sub-task already processed (e.g., the data in the staging buffer 207) from the portion of the sub-task yet to be processed (e.g., the data in the temporary buffer 209). Once delineated, the portion of the sub-task already processed, that is, the portion in the staging buffer 207, is stored in a storage device at step 405. The storage device may comprise a virtualized instance of a storage service, a persistent storage such as a database, or a portion of non-volatile memory. In addition, a new sub-task is generated and enqueued in the task queue corresponding to the remaining, unprocessed portion (e.g., temporarily stored in a temporary buffer 209).

Once operation of the system resumes, the sub-tasks are assigned and/or received and processed by the respective map processing node as usual, beginning with the position corresponding to the offset (f) in the sub-task to begin processing. Thus, when a processing node obtains the new sub-task comprising of the unprocessed portion of the previous sub-task interrupted by system termination, the processing node will begin processing at the offset position (e.g., the position created by the checkpoint) and forego processing of data corresponding to earlier (already processed) positions.

By leveraging the capabilities of dedicated computing components (which may or may not be cloud components), a distributed parallel processing framework can be implemented which can still provide the benefits of concurrent parallel processing of map tasks while avoiding processed data loss occurring during a system termination. Accordingly, this allows a MapReduce framework executed on large data centers such as cloud computing infrastructures the flexibility to operate even in a spot market.

Figure 5:
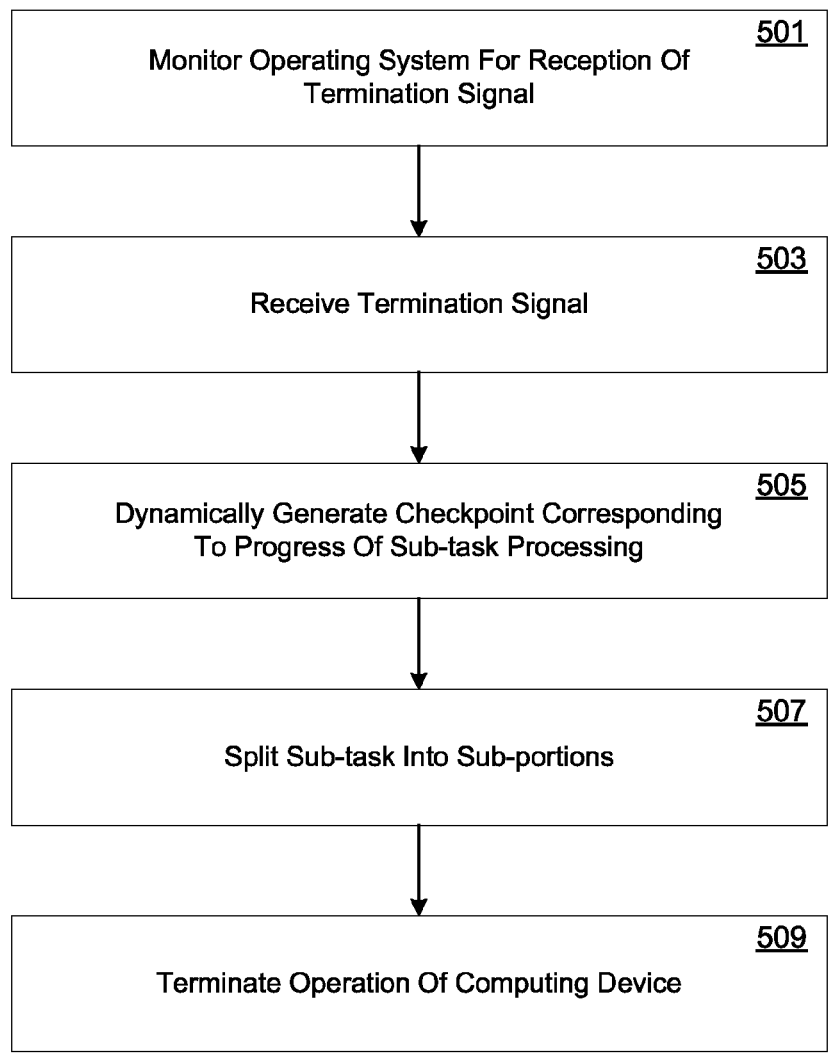
FIG. 5 depicts a flowchart of a process for monitoring operating systems for system terminations to facilitate efficient system restoration and data preservation, in accordance with embodiments of the present disclosure.

FIG. 5 depicts a flowchart of a process 500 for monitoring operating systems for system terminations to provide efficient system restoration and data preservation, in accordance with embodiments of the present disclosure. Steps 501-509 describe exemplary steps comprising the process 400 in accordance with the various embodiments herein described.

At step 501, the operating system hosted on a computing system or systems executing a distributed parallel processing framework is monitored to detect impending termination of the computing system. Monitoring the operating system may comprise, for example, monitoring for a termination signal, such as a shutdown request from a cloud component manager.

At step 503, the termination signal is received by the operating system and detected. In typical cloud computing infrastructures that utilize spot market rate variability, rather than an immediate shutdown of provisioned resources, a graceful termination (typically up to a few minutes) is performed by enacting shutdown scripts in the operating systems hosted on the terminating components. These shutdown scripts typically give a small "grace" period (e.g., up to a few minutes) wherein executing applications can save progress and prepare for termination. If the shutdown process still has not finished during the grace period. A resource manager (e.g., a hypervisor in the case of virtual machines) corresponding to the component (or instance) forcefully terminates the component (or instance) by simulating a power off event at step 509. Such a window may be wholly insufficient to save the progress (e.g., intermediate data) of traditional distributed parallel processing frameworks (such as MapReduce) however, and may result in significant loss of processed data and time.

According to one embodiment, the shutdown scripts of the operating systems are modified such that when a shutdown script is invoked, the shutdown script first issues a signal to the distributed parallel processing applications, prompting the applications to save their respective states (e.g., in persistent storage or non-volatile memory) as necessary. The scripts subsequently enter an idle or "sleep" state and are prevented from executing the remainder of the shutdown script. During the remaining grace period after reception of the termination signal at step 503 and prior to system termination at step 509, a checkpoint is dynamically generated in each currently processing sub-task at step 505. The checkpoint is generated at a position corresponding to the achieved progress of processing the sub-task. This position may be noted in a task queue corresponding to the sub-task as an offset position.

Also during the grace period, the sub-tasks are split into sub-portions at the checkpoint position at step 507. When the distributed parallel processing applications receive a terminate signal from the shutdown scripts (e.g., at step 503), the current user-defined map function (e.g., function 205) is immediately halted. The process then begins to flush the staging buffer 207 to persistent (or non-volatile) storage.

Once the staging buffer is successfully flushed, a commit message is delivered to the persistent storage indicating the id of the processing node, the map task split and the offset corresponding to the reception of the termination signal (e.g., the checkpoint) which indicates the position from where the next map task should resume processing when system operation is resumed. Finally, a new sub-task corresponding to the incomplete processing is enqueued in the task queue and the previous sub-task is removed.

Figure 6:
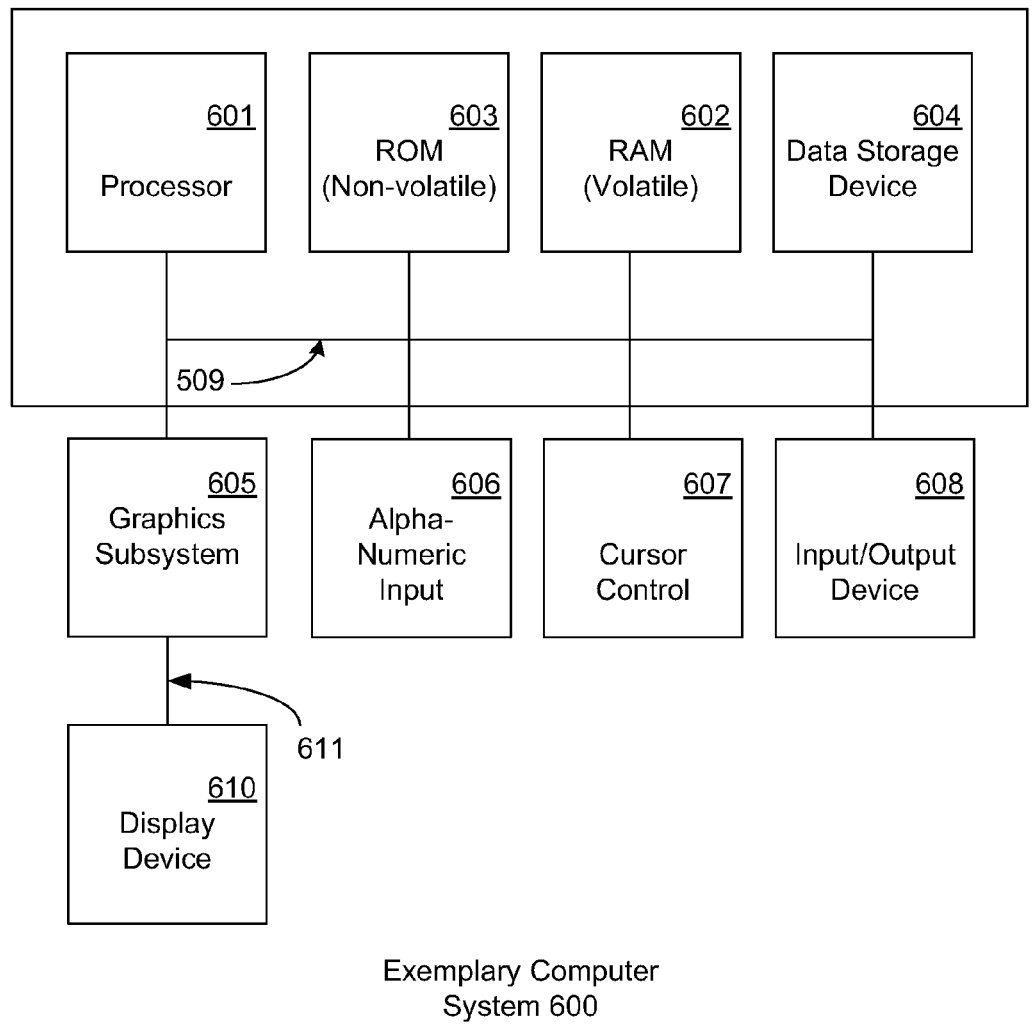
FIG. 6 depicts a block diagram of a computing system upon which embodiments of the present disclosure may be implemented.

As presented in FIG. 6, an example computing system upon which embodiments of the presently claimed subject matter can be implemented includes a general purpose computing system environment, such as computing system 600. In its most basic configuration, computing system 600 typically includes at least one processing unit 601 and memory, and an address/data bus 609 (or other interface) for communicating information. Depending on the exact configuration and type of computing system environment, memory may be volatile (such as RAM 602), non-volatile (such as ROM 603, flash memory, etc.) or some combination of the two. In further embodiments, system 600 may also comprise a plurality of processing units 601 capable of performing parallel processing. Computing system 600 may be used to host one or more instances of one or more virtual machines, such as processing nodes, persistent storage components or message queue components, as described above and in accordance with various embodiments.

Computer system 600 may also comprise an optional graphics subsystem 605 for presenting information to the computer user, e.g., by displaying information on an attached display device 610, connected by a video cable 611. Additionally, computing system 600 may also have additional features/functionality. For example, computing system 600 may also include additional storage (removable and/or non-removable) including, but not limited to, magnetic or optical disks or tape. Such additional storage is illustrated in FIG. 6 by data storage device 604. Computer storage media includes volatile and nonvolatile, removable and non-removable media implemented in any method or technology for storage of information such as computer readable instructions, data structures, program modules or other data. RAM 602, ROM 603, and data storage device 604 are all examples of computer storage media.

Computer system 600 also comprises an optional alphanumeric input device 606, an optional cursor control or directing device 607, and one or more signal communication interfaces (input/output devices, e.g., a network interface card) 608. Optional alphanumeric input device 606 can communicate information and command selections to central processor(s) 601. Optional cursor control or directing device 607 is coupled to bus 609 for communicating user input information and command selections to central processor 601. Signal communication interface (input/output device) 608, also coupled to bus 609, can be a serial port. Communication interface 609 may also include wireless communication mechanisms. Using communication interface 609, computer system 600 can be communicatively coupled to other computer systems over a communication network such as the Internet or an intranet (e.g., a local area network), or can receive data (e.g., a digital television signal).

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for performing distributed parallel processing tasks, the method comprising:

receiving an input task in an application executing on a first computing device of a plurality of computing devices;

partitioning the input task into a plurality of sub-processing tasks, each of the plurality of sub-processing tasks corresponding to a message of an instance of a cloud infrastructure implemented messaging service;

distributing the sub-processing tasks among the plurality of computing devices;

performing the sub-processing tasks in the plurality of computing devices;

receiving a notification of an impending termination of one or more computing devices of the plurality of computing devices;

for each computing device of the plurality of computing devices in the process of performing a sub-processing task, when the notification of termination is received:

creating a checkpoint in the sub-processing task corresponding to a portion of the sub-processing task already performed;

storing the portion of the sub-processing task already performed in a storage device; and generating a new sub-processing task comprising the remaining portion of the sub-processing task that was not already performed, wherein the notification of termination is received by monitoring an operating system executing in the plurality of computing devices.

2. The method according to claim 1, wherein the partitioning the input task into a plurality of sub-processing tasks comprises placing the sub-processing tasks into a task queue.

3. The method according to claim 2, wherein the task queue comprises an instance of a queue messaging service.

4. The method according to claim 3, wherein the instance of the queue messaging service is an instance of a cloud infrastructure component.

5. The method according to claim 2, wherein the method further comprises adding the new sub-processing task to the task queue.

6. The method according to claim 1, wherein the storing the portion of the sub-processing task already performed comprises storing the portion of the sub-processing task already performed in an instance of a storage service.

7. The method according to claim 6, wherein the instance of the storage service comprises an instance of a cloud infrastructure component.

8. The method according to claim 6, wherein the instance of the storage service is an instanced database.

9. The method according to claim 1, wherein the creating, the storing, and the generating are performed before the termination of the one or more computing devices of the plurality of computing devices occurs.

10. The method according to claim 1, wherein the plurality of computing devices comprises a plurality of instanced cloud infrastructure components.

11. The method according to claim 10, wherein the plurality of instanced cloud infrastructure components comprises a plurality of instanced virtual machines.

12. The method according to claim 1, wherein a sub-processing task of the plurality of sub-processing tasks is comprised from the group comprising: a map task and a reduce task.

13. The method according to claim 1, wherein the method is performed in a spot market for the cloud infrastructure.

14. The method according to claim 13, wherein the application corresponds to a threshold service rate of the plurality of computing devices and the notification of termination is received when the service rate increases above the threshold service rate of the plurality of computing devices.

15. The method according to claim 1, wherein the receiving the notification of termination comprises executing a shutdown script in the plurality of computing devices.

16. A system for performing distributed parallel processing tasks, the system comprising:

a plurality of computing devices configured to perform processing of input tasks in parallel;

a storage device; and a task queue;

wherein an input task of an application is partitioned into a plurality of sub-processing tasks, stored in the task queue, and assigned to the plurality of computing devices to be processed, each of the plurality of sub-processing tasks corresponding to a message of an instance of a cloud infrastructure implemented messaging service, wherein the notification of termination is received by monitoring an operating system executing in the plurality of computing devices, further wherein, in response to a notification of an impending termination being received for a computing device of the plurality of computing devices, a checkpoint is created in each sub-processing task corresponding to the portion of the sub-processing task already performed, the portion of the sub-processing task already performed is committed to the storage device, and a new sub-processing task comprising the remaining portion of the sub-processing task that was not performed is generated in the task queue.

17. The system according to claim 16, wherein the task queue comprises an instance of a queue messaging service.

18. The system according to claim 16, wherein the storage device comprises an instance of a storage service.

19. The system according to claim 16, wherein the instance of the storage service is an instanced database.

20. The system according to claim 16, wherein the checkpoint is created, the portion of the sub-processing task already performed is committed, and the new sub-processing task is generated prior to a termination of the plurality of computing devices.

21. The system according to claim 16, wherein the plurality of computing devices comprises a plurality of instanced virtual machines.

22. The system according to claim 16, wherein a sub-processing task of the plurality of sub-processing tasks is comprised from the group comprising: a map task and a reduce task.

23. The system according to claim 16, wherein the plurality of computing devices, the storage device, and the task queue comprise instances of the cloud infrastructure.

24. The system according to claim 23, wherein the cloud infrastructure implements a spot market mechanism, wherein service rates for instances of the cloud infrastructure have varying rates of service corresponding to an aggregate current demand.

25. The system according to claim 24, wherein the application corresponds to a threshold rate of service.

26. The system according to claim 25, wherein the notification of termination is received as a result of the service rates for instances of the cloud infrastructure exceeding the threshold rate of service.

27. The system according to claim 16, wherein a status of the plurality of computing devices and a status of the plurality of sub-processing tasks is stored in the storage device.

28. The system according to claim 16, wherein each message corresponds to a unique map 10.

29. The system according to claim 16, wherein each message corresponds to an offset corresponding to a position of the sub-processing task in the input task.

30. The system according to claim 16 further comprising a reduce queue, wherein an output generated by completing the plurality of sub-processing tasks is stored in the reduce queue.

31. A method for generating on-demand checkpoints based on an interrupted operation, the method comprising:

in a computing device hosting an application and during a processing of an application task partitioned into a plurality of sub-tasks, each of the plurality of sub-tasks corresponding to a message of an instance of a cloud infrastructure implemented messaging service, monitoring an operating system executing in the computing device for a reception of an impending termination signal;

receiving the termination signal, the termination signal signifying an impending termination of an operation of the computing device;

for each sub-task of the plurality of sub-tasks, dynamically generating a checkpoint corresponding to a progress in the processing of a sub-task;

splitting the sub-task into two sub-portions, the first sub-portion comprising a processed portion of the sub-task and the second sub-portion comprising the unprocessed portion of the sub-task; and terminating an operation of the computing device.

32. The method according to claim 31, further comprising storing the processed portion of the sub-task as a completed task in a non-volatile memory prior to terminating an operation of the computing device.

33. The method according to claim 32, further comprising adding a new sub-task to the plurality of sub-tasks, the new sub-task comprising the second subportion prior to terminating an operation of the computing device.

34. The method according to claim 31, further comprising resuming operation of the computing device.

35. The method according to claim 34, wherein once operation of the computing device is resumed, processing of the plurality of sub-tasks is continued.

36. The method according to claim 31, wherein the plurality of sub-tasks is stored in a queue.

37. The method according to claim 36, wherein the queue is stored in non-volatile memory.

38. The method according to claim 31, wherein the computing device is communicatively coupled to a plurality of computing devices, and wherein each of the plurality of computing devices is assigned a sub-task of the plurality of sub-tasks for processing.

39. A non-transitory computer readable storage medium containing program instructions embodied therein for causing a computing system to implement the generation of on-demand checkpoints in response to an interrupted operation, the program instructions being executed by a computing device hosting an application and during a processing of an application task partitioned into a plurality of sub-tasks, each of the plurality of sub-tasks corresponding to a message of an instance of a cloud infrastructure implemented messaging service, the program instructions comprising, program instructions to monitor an operating system executing in the computing device for a reception of an impending termination signal;

program instructions to receive the termination signal, the termination signal signifying an impending termination of an operation of the computing device; for each sub-task of the plurality of sub-tasks, program instructions to dynamically generate a checkpoint corresponding to a progress in the processing of a sub-task;

program instructions to split the sub-task into two sub-portions, the first sub-portion comprising a processed portion of the sub-task and the second sub-portion comprising the unprocessed portion of the sub-task; and program instructions to terminate an operation of the computing device.

40. The program instructions according to claim 39, further comprising instructions to store the processed portion of the sub-task as a completed task in a non-volatile memory prior to terminating an operation of the computing device.

41. The program instructions according to claim 40, further comprising instructions to add a new sub-task to the plurality of sub-tasks, the new subtask comprising the second sub-portion prior to terminating an operation of the computing device.

42. The program instructions according to claim 39, further comprising instructions to resume operation of the computing device.

43. The program instructions according to claim 42, further comprising instructions to continue processing the plurality of sub-tasks once operation of the computing device is resumed.

44. The program instructions according to claim 39, wherein the plurality of sub-tasks is stored in a queue.

45. The program instructions according to claim 44, wherein the queue is stored in non-volatile memory.

46. The program instructions according to claim 39, wherein the computing device is communicatively coupled to a plurality of computing devices, and wherein each of the plurality of computing devices is assigned a sub-task of the plurality of sub-tasks for processing.

* * * * *